US012717902B2

(12) United States Patent
Krishnan et al.

(10) Patent No.: US 12,717,902 B2
(45) Date of Patent: Aug. 25, 2026

(54) SECURITY AND SUPPORT FOR TRUST DOMAIN OPERATION

(71) Applicant: Intel Corporation, Santa Clara, CA (US)

(72) Inventors: Vidhya Krishnan, Folsom, CA (US); Ankur Shah, Folsom, CA (US); Bryan White, Chandler, AZ (US); Daniel Nemiroff, El Dorado Hills, CA (US); David Puffer, Tempe, AZ (US); Julien Carreno, El Dorado Hills, CA (US); Scott Janus, Loomis, CA (US); Ravi Sahita, Portland, OR (US); Hema Nalluri, Bengaluru (IN); Utkarsh Y. Kakaiya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1012 days.

(21) Appl. No.: 17/711,883

(22) Filed: Apr. 1, 2022

(65) Prior Publication Data

US 2022/0222340 A1 Jul. 14, 2022

(51) Int. Cl.
*G06F 21/55* (2013.01)
*G06F 9/50* (2006.01)
(Continued)

(52) U.S. Cl.
CPC ............ *G06F 21/554* (2013.01); *G06F 9/505* (2013.01); *G06F 21/54* (2013.01); *G06F 21/604* (2013.01)

(58) Field of Classification Search
CPC ..... G04L 9/0637; G06F 21/554; G06F 9/505; G06F 21/54; G06F 21/604; G06F 9/1458;
(Continued)

(56) References Cited

U.S. PATENT DOCUMENTS 7,376,974 B2 * 5/2008 Proudler ................ G06F 21/62 713/164
7,865,893 B1 * 1/2011 Omelyanchuk ..... G06F 9/45545 718/1

(Continued)

OTHER PUBLICATIONS

Intel, "Intel® Iris® Xe MAX Graphics Open Source Programmer's Reference Manual for the 2020 Discrete GPU formerly named "DG1"", vol. 13: General Assets, Feb. 2021, Revision 1.0, 100 pages.

(Continued)

*Primary Examiner* — Catherine Thiaw
(74) *Attorney, Agent, or Firm* — Nicholson De Vos Webster & Elliott LLP

(57) ABSTRACT

Security and support for trust domain operation is described. An example of a method includes processing, at an accelerator, one or more compute workloads received from a host system; upon receiving a notification that a trust domain has transitioned to a secure state, transition an original set of privileges for the accelerator to a downgraded set of privileges; upon receiving a command from the host system for the trust domain, processing the command in accordance with the trust domain; and upon receiving a request from the host system to access a register, for a register included in an allowed list of registers for access, allow access to the register, and, for a register that is not within the allowed list of registers for access, disallowing access to the register.

21 Claims, 9 Drawing Sheets

(51) Int. Cl.

*G06F 21/54* (2013.01)
*G06F 21/60* (2013.01)

(58) Field of Classification Search

CPC ... G06F 9/30145; G06F 9/3318; G06F 9/4893
See application file for complete search history.

(56) References Cited

U.S. PATENT DOCUMENTS

| | | | | |
|---|---|---|---|---|
| 10,181,946 | B2 | 1/2019 | Lal et al. | |
| 10,509,666 | B2 * | 12/2019 | Asaro | G06F 13/372 |
| 10,956,321 | B2 * | 3/2021 | Ferguson | H04L 63/0428 |
| 11,656,916 | B2 | 5/2023 | Kakaiya et al. | |
| 12,242,653 | B2 * | 3/2025 | Wallach | G06F 12/1483 |
| 2006/0236371 | A1 * | 10/2006 | Fish | G06F 21/74 726/2 |
| 2014/0104287 | A1 * | 4/2014 | Nalluri | G06F 21/74 345/522 |
| 2015/0082305 | A1 * | 3/2015 | Hepkin | G06F 21/53 718/1 |
| 2015/0199514 | A1 * | 7/2015 | Tosa | G06F 21/53 726/17 |
| 2016/0224484 | A1 * | 8/2016 | Bonzini | G06F 13/32 |
| 2017/0024584 | A1 | 1/2017 | Chhabra et al. | |
| 2017/0090800 | A1 | 3/2017 | Alexandrovich et al. | |
| 2019/0227743 | A1 * | 7/2019 | Hamilton | G06F 3/061 |
| 2019/0310892 | A1 * | 10/2019 | Frolikov | G06F 9/5083 |
| 2020/0074083 | A1 * | 3/2020 | Hou | G06F 11/1417 |
| 2020/0174838 | A1 * | 6/2020 | Li | G06F 9/505 |
| 2020/0356703 | A1 * | 11/2020 | Gligor | G06F 9/45558 |
| 2021/0049292 | A1 * | 2/2021 | Ionescu | G06F 21/6218 |
| 2021/0089466 | A1 * | 3/2021 | Shanbhogue | G06F 9/45558 |
| 2021/0097184 | A1 * | 4/2021 | Rao | G06F 21/51 |
| 2021/0173666 | A1 * | 6/2021 | Cheng | G06F 9/545 |
| 2021/0176035 | A1 * | 6/2021 | Cheng | H04L 9/30 |
| 2023/0110230 | A1 | 4/2023 | Kida et al. | |
| 2023/0267235 | A1 * | 8/2023 | Rao | G06F 21/72 713/192 |
| 2023/0315857 | A1 | 10/2023 | Sahita et al. | |

OTHER PUBLICATIONS

Security of the Intel Graphics Stack—Part 1—Introduction—Igor's Blog, Feb. 2021, retrieved Jun. 27, 2022 at: https://igor-blue.github.io/2021/02/10/graphics-part1.html, 19 pages.

Security of the Intel Graphics Stack—Part —-FW <- > GuC—Igor's Blog, Feb. 2021, retrieved Jun. 27, 2022 at: https://igor-blue.github.io/2021/02/24/graphics-part2.html, 55 pages.

* cited by examiner

SECURITY AND SUPPORT FOR TRUST DOMAIN OPERATION

FIELD

This disclosure relates generally to the field of electronic devices and, more particularly, security and support for trust domain operation.

BACKGROUND

Processing of compute workloads by accelerators, such as graphics processing units, is becoming more critical across multiple business domains. There is also a strong desire to move these workloads to the cloud for optimizing the overall cost of operations. However, it is also essential to ensure that the security of processing is not compromised in the move to cloud processing.

In the handling of such compute workloads in an accelerator, there are varying privilege levels that restrict access to resources such as registers. The use of trust domains in processing may alter these privilege levels, and thus issues may arise regarding application of needed restrictions in access to ensure that security of data is maintained while also preserving functionality in processing.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
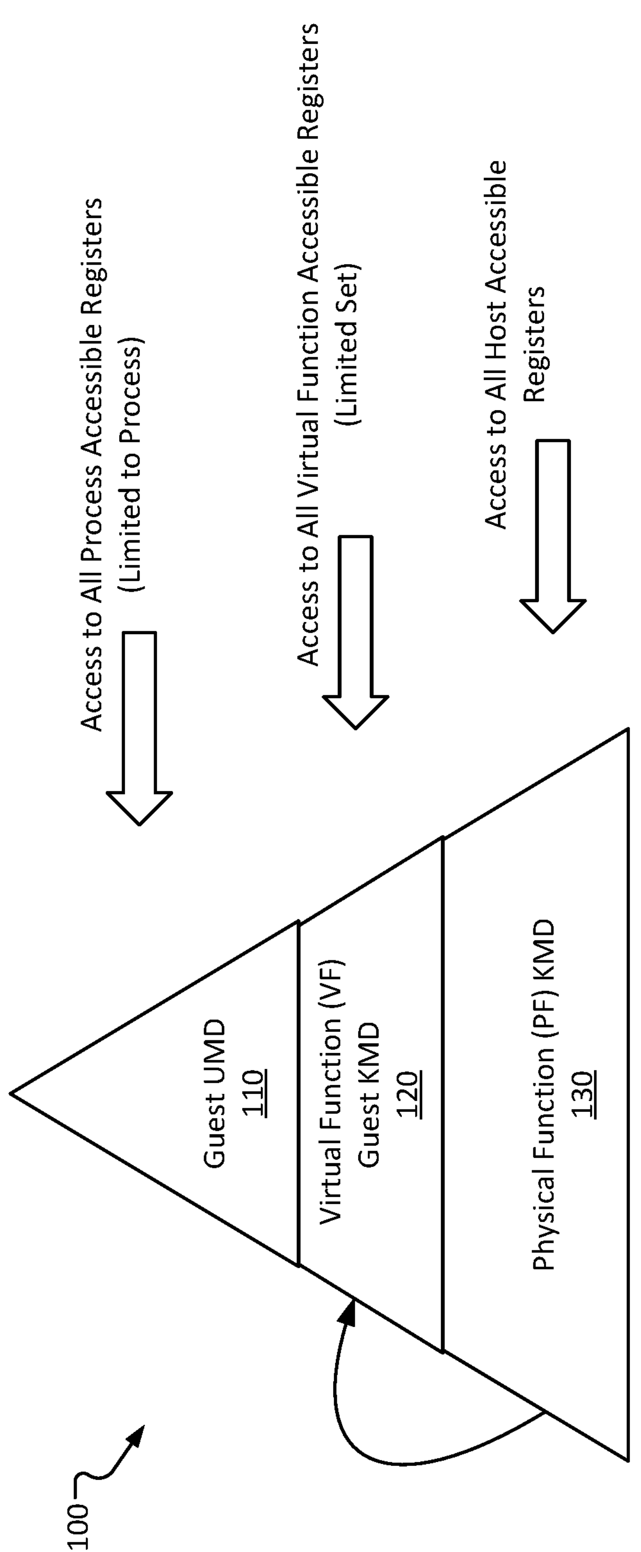
FIG. 1 illustrates an example of privilege levels in a programming model of a system.

Embodiments described herein are directed to security and support for trust domain operation.

In processing of compute workloads, such as in cloud processing, a system infrastructure may include the operation of trust domain (TD) in a host system. A trust domain (TD) refers to a hardware-isolated, virtual machine (VM). A trust domain architecture may operate to support one or more trust domains, such as Intel TDX (Trust Domain Extensions) designed to isolate VMs from a virtual-machine manager (VMM) (i.e., a hypervisor) and any other non-TD software on the platform to protect TDs from a broad range of software.

A system may include a host system with one or more processors, such as a central processing unit (CPU), and further include an accelerator in an apparatus, where the accelerator may include a graphics processing unit (GPU). As used herein, an "accelerator" refers to an apparatus to accelerate processing operation by one or more processors. An accelerator may include a GPU, an ASIC (Application-Specific Integrated Circuit), an FPGA (Field-Programmable Gate Array), or other accelerator apparatus. In a particular example, a GPU may handle compute workloads in an operation to increase processing efficiency.

For GPU operation, GPU drivers include a KMD (Kernel Mode Driver) and UMD (User Mode Driver) (where a user mode driver represents code running in a same context and address space as an application). In GPU operation, a virtual machine manager (VMM) and PF KMD (Physical Function Kernel Mode Driver) have traditionally operated at a higher privilege for the GPU. These elements control the overall configuration of the GPU, and are further involved in reconfiguring the GPU between workloads if required for implementing configurations. This can impact the entire GPU, with the impact not being limited to a single workload (process) or virtual function.

In some embodiments, in order to support security in operation, restrictions are imposed regarding access by elements including a hypervisor (the VMM) and graphics driver (the KMD) to a GPU (or other accelerator) in a trust domain environment, while functionality of the hypervisor and graphics driver are maintained to ensure that the GPU remains operational for proper processing of compute use cases. In some embodiments, improved register protection is provided in a trust domain architecture, such as in aspects of overall TDX I/O support. The improved register protection may include Memory Mapped IO (MMIO) protection to ensure the range of GPU MMIO is protected from the PF KMD once a trust domain is in a secure state (i.e., a locked or a run state), while also ensuring that there is sufficient flexibility to allow for the normal operation of a guest. In some embodiments, the improved register protection may further provide the PF KMD (or the VMM) with a higher privilege secure batch that is to execute prior to the actual workload to allow for normal functioning, which includes the PF KMD to intervene during normal workload submission.

In some embodiments, an apparatus, system, or process provides one or more of the following:

(a) A boot time configuration to indicate if a system supports a trust domain, such as, for example, support for TDX I/O.

(b) A GPU front end engine to downgrade PF (physical function) privileges to VF (guest) privileges when a TD enters a secure state. In some embodiments, the PF privileges are downgraded to VF privileges for the GPU when a single secure connection is established between a TD on a CPU (host processor) and a TD on a GPU.

(c) A graphics microcontroller that is trusted.

(d) A graphics microcontroller register range that is open for access by the host, the access being allowed because only trusted firmware runs on the graphics microcontroller. In an example, the GuC (Graphics MicroController) firmware is trusted and is part of the TDX TCB (Trusted Computing Base).

(e) A host interface including an allowed list of registers programmed by a security controller. Once the host interface is "locked" for a secure state, only the registers in the list are allowed for access. The relative offsets for the allowed list of registers are specified and applied to the base of each of the engines of the GPU.

(f) One or more secure batch buffers associated with a trust domain may be authenticated by a controller, with the authenticated secure buffers being allowed access to PF privileged registers while the TD is in a secure state. For a secure batch, the GPU context is switched to execute the configured secure-batch with original privileges, and then the context is switched back to the guest/user-space with downgraded privileges.

The secure batch buffers are to be stored in a secure location in memory, wherein the secure location may include sequestered memory or integrity protected memory. The authentication of the secure batch buffers may include, but is not limited to, authentication at a boot up time.

(g) A confidentiality bit that is propagated back from a host interface of a device to the host system to indicate a transaction is made on behalf of a trust domain device.

FIG. 1 illustrates an example of privilege levels in a programming model of a system. In general, hierarchical protection domains, also referred to as protection rings, are mechanisms to protect data and functionality from faults by improving fault tolerance and malicious behavior by providing computer security. Computer operating systems in general provide different levels of access to resources. For example, a protection ring is one of a set of hierarchical levels or layers of privilege within the architecture of a computer system. This may be hardware-enforced by certain CPU architectures that provide different CPU modes at the hardware or microcode level.

The protection rings are commonly arranged in a hierarchy from most privileged (most trusted, which is typically designated as the zero level (Ring0)) to least privileged (least trusted, which is typically designated as the highest ring number). On most operating systems, Ring0 is the level with the most privileges and interacts most directly with the physical hardware, which may include register access.

A traditional programming model for a GPU in a virtualized environment includes a set of privilege levels. The set of privilege levels includes the guest user node driver (Guest UMD) at a first privilege level, the guest kernel mode driver (Guest KMD, for VF (Virtual Function)) at a second privilege level, and a physical function (PF) Driver at a third privilege level. For example, as shown in FIG. 1, the set of privilege levels may include:

(a) A first privilege level for the Guest UMD 110, wherein the Guest UMD has access to all process accessible registers (limited to a particular process).

(b) A second privilege level for the VF Guest KMD (Kernel Mode Driver) 120, wherein the Guest KMD has access to all virtual function accessible registers, this being a limited set of registers.

(c) A third privilege level for PF (Physical Function) KMD 130, wherein the PF KMD has access to all host accessible registers.

The privilege levels will be modified in differing implementations, such as in a trust domain implementation. With, for example, Intel TDX I/O (Trust domain Extensions Input/Output) the privilege level is changed such that a guest only trusts itself, and not the host, for any programming.

In some embodiments, an apparatus, system, or process provides register protection in trust domain operation. The register protection may include downgrading the PF privileges 130 to VF privileges 120, thus limiting the registers that are accessible to provide added security in TD operation.

In some embodiments, the apparatus, system, or process further provides support for secure batch buffer handling in the trust domain operation, wherein the GPU context is switched execute an authenticated secure batch buffer with privileges returned to an original set of privileges, and following execution the GPU context is switch back with the downgraded privileges.

Figure 2:
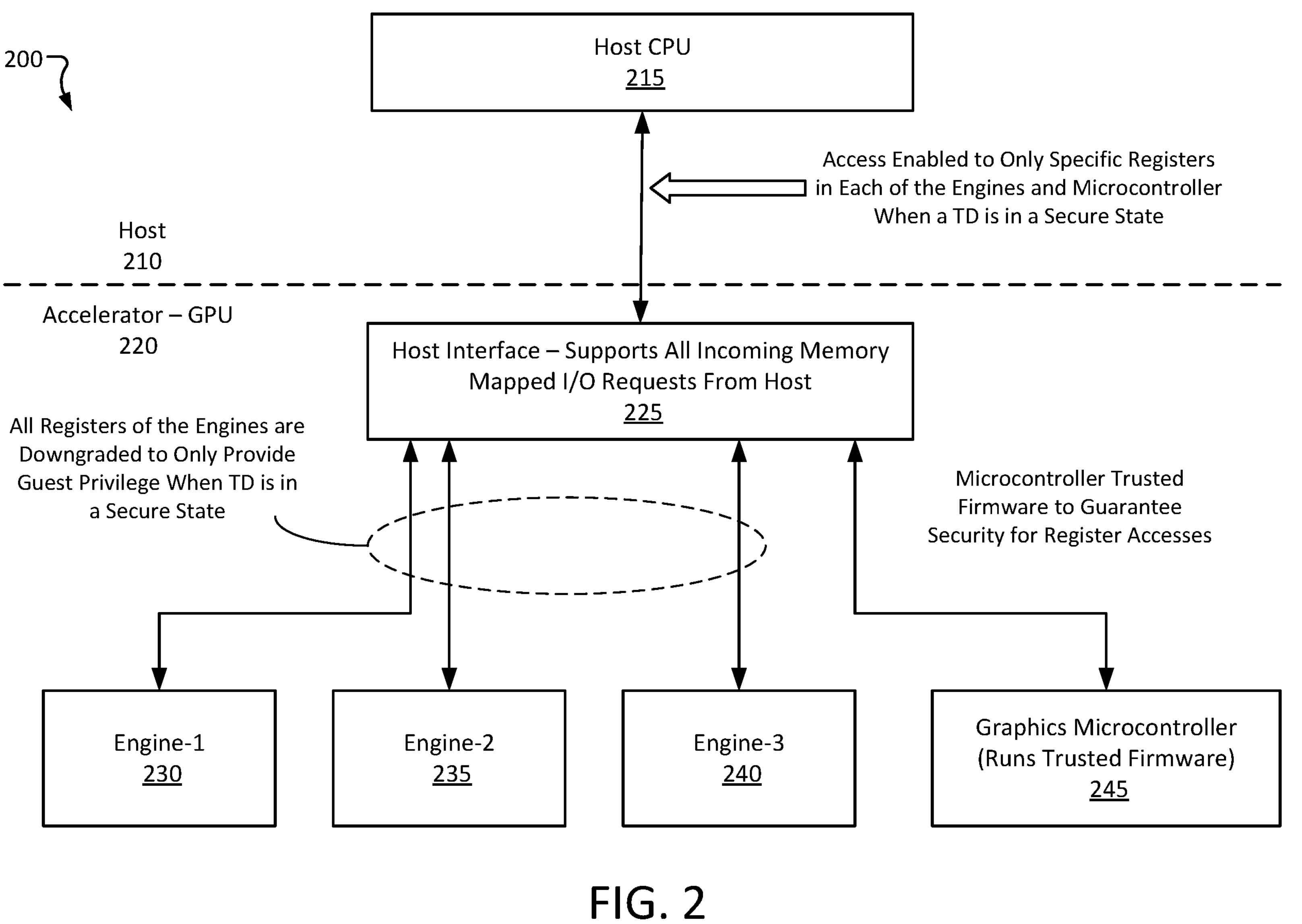
FIG. 2 illustrates a high-level architecture of a system including a graphics processing unit, according to some embodiments.

FIG. 2 illustrates a high-level architecture of a system including a graphics processing unit, according to some embodiments. In a system 200, a host 210 and an accelerator (such as a GPU) 220 operate to provide register protection and secure batch buffer support. The host 210 includes one or more processors such as a host CPU 215 (or other processor), the host CPU 215 including access to a host interface 225 of the GPU 220. As illustrated, the host interface 225 provides support for all incoming memory mapped requests from the host 210. The host 210 may provide service for multiple guests, the guests requesting processing services. The host 210 may support one or more trust domains that are to run on the host CPU 215. Further, the GPU 220 may support one or more trust domains, wherein the CPU 215 may establish a secure connection between a TD of the CPU 215 and a TD of the GPU 220.

The GPU 220 further includes one or more processing engines, shown as Engine-1 230, Engine-2 235, and Engine-3 240. Varying embodiments may include any number of processing engines. In some embodiments, the GPU 220 further includes a graphics microcontroller 245. In some embodiments, the graphics microcontroller 245 includes trusted firmware to enable security for register accesses.

In a virtualized environment, during normal operation the physical function driver/VMM is trusted for availability and for providing virtual function isolation by all the guests. All of the GPU memory mapped register space is accessible by the entities operating at PF KMD (or Ring0) privilege. However, in a trust domain mode, such as TDX I/O mode, the physical function (PF) driver and VMM are not trusted, and the guests thus may require additional protection from a malicious physical function driver or VMM. In some embodiments, the system may be operable to provide protection from malicious access to registers containing data for guest processing.

In some embodiments, to provide support for MMIO protection, once a trust domain is established and the trust domain is in a secure (locked or run) state on the GPU, all PF KMD write accesses except for a specified list of allowed registers are detected as an attack on the trust domain. In some embodiments, the list of allowed registers may be verified as registers that do not impact the security properties of the trust domain, and that are utilized for normal functioning of the guest. Whenever an access to the non-allowed range of registers (i.e., the registers outside of the list of allowed registers) occurs from the host during a period when the trust domain is in a secure state, an attack is detected, and an unsupported request (UR) response is sent back to host and an error interrupt is sent to the trust domain running on the CPU host to enable it to transition to an error state, wherein the error state may include halting operations for the trust domain or any other actions to protect data security.

In an example, the host 210 may include one or more trust domains, and the GPU may include one or more trust domains. A boot time configuration is provided to initially indicate if the system supports a trust domain, such as, for example, support for TDX I/O. In a system that supports a particular trust domain, the trust domain may transition to a secure state during operation, and access is then enabled only to specific registers in each of the engines 230-240 and the graphics microcontroller while the TD is in the secure state.

In some embodiments, PF (Physical Function) privileges are downgraded to VF (Virtual Function for a guest) privileges when a secure connection is established between a TD on the CPU and a TD on the GPU. The secure connection may be indicated by, for example, a configuration bit being set. As shown in FIG. 2, when the configuration bit is set the registers of the GPU engines 230-240 are downgraded to only provide a guest privilege. Further, microcontroller firmware of the graphics microcontroller is to guarantee security for access to the registers of the microcontroller 245. A graphics microcontroller register range that is open for access by the host is established, with the access being allowed by the trusted firmware.

In some embodiments, authentication of a secure batch buffer associated with a trust domain is provided, as further described below. In some embodiments, authentication of a secure batch buffer may be provided at boot up or another time. Further, the secure batch buffer may be copied to a secure location, such as sequestered memory or integrity protected memory.

Figure 3:
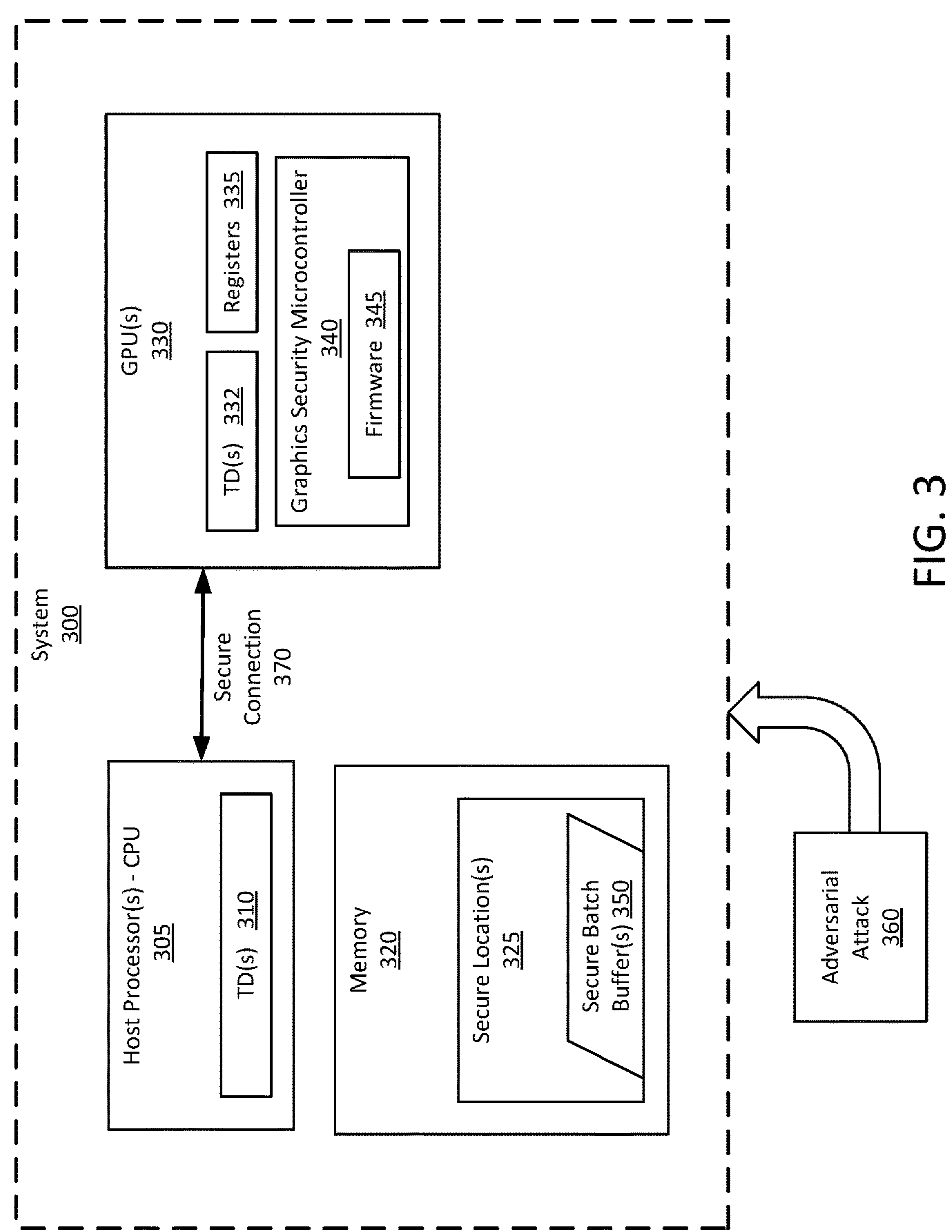
FIG. 3 is an illustration of a system to provide register protection and secure batch buffer support in processor operation, according to some embodiments.

FIG. 3 is an illustration of a system to provide register protection and secure batch buffer support in processor operation, according to some embodiments. In some embodiments, a system 300, which may include multiple physical machines, include one or more host processors 305, such as one or more CPUs or other processors. In operation, the host processors 305 may run one or more trust domains (TD(s)) The system further includes memory 320, which may include computer memory in multiple machines. The memory may include one or more secure memory locations 325, such as sequestered memory or integrity protection regions of the memory 320.

The system 300 may further include one or more accelerators such as the illustrated one or more GPUs 330 that may be utilized to process compute workloads. The GPU 330 may run one or more trust domains 332. The GPU 330 may include multiple registers 335, where authority to access the registers 335 may be dependent on a privilege level. Current privilege levels may be modified upon a trust domain 310 moving to a secure state, with a secure connection being established between the trust domain 310 of the host processor 305 and a trust domain 332 of the GPU 330. The system 300 may further include a graphics microcontroller 340, the graphics microcontroller 340 including firmware 345.

In some embodiments, the system is to provide added security for trust domain operation, which may include added security from an adversarial attack 360 that seeks to defeat operation of a trust domain. In some embodiments, a TD 310 on host processor 305 may enter into a secure state, and establish a secure connection for a session with a TD 332 on the GPU 330. Upon at least one secure connection being established between a TD 310 for the host processor 305 and a TD 332 for the GPU 330, the GPU is to transition to a secure state, wherein:

(a) All PF (physical function) privileges are downgraded to VF (virtual function) privileges.

(b) An attempted access to any higher privilege registers outside of the established privileges will result in the GPU 330 returning an unsupported request (UR) response.

(c) Certain accesses will result in the TD 332 on the GPU 330 generating an error interrupt to the respective TD 310 running on the host processor 305.

In some embodiments, the GPU 330 is to receive an indication regarding a trust domain entering into a secure state. In an example, a command may include a configuration bit to indicate a trusted domain status. In other examples, a different indication regarding a TD secure state may be received. Upon determining that a trust domain is in a secure state, such as receiving a command and determining that the configuration bit indicates a secure state, the GPU is to downgrade the PF (physical function) privileges to VF (guest) privileges for the GPU, thereby preventing unauthorized accesses by the PF KMD.

In some embodiments, the graphics microcontroller is trusted by the trust domain 310. The graphics microcontroller 340 includes a register range that is open for access by the host processor 305, the access being allowed by the firmware 345. However, access to registers outside of the range are not allowed, thus providing protection for registers of the graphics microcontroller 340 when a trust domain is in a secure state.

Figure 4:
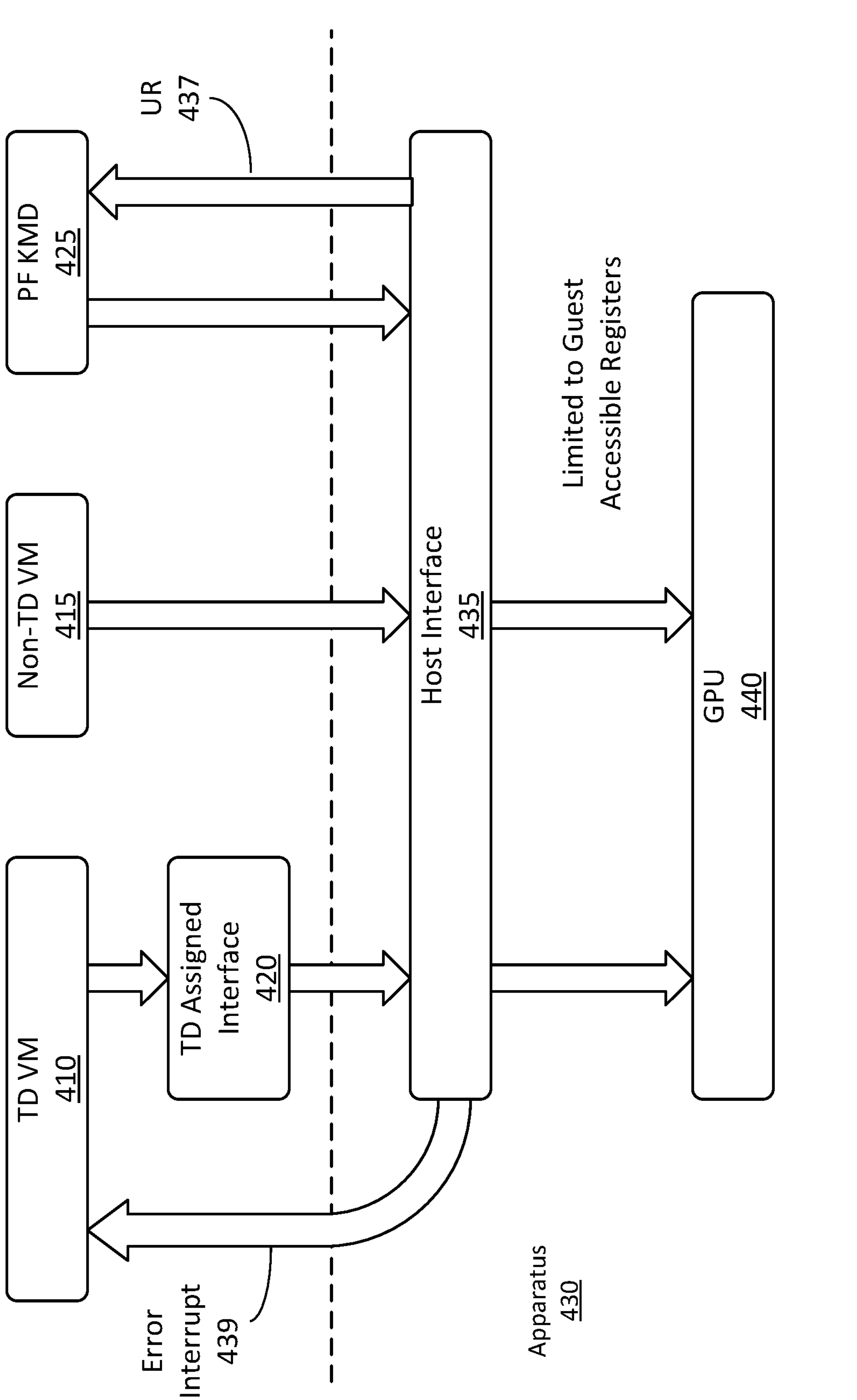
FIG. 4 is an illustration of a host interface for a system or apparatus, according to some embodiments.

In some embodiments, a host interface, such as illustrated in FIG. 4, further includes an allowed list of registers, as programmed by a security controller. Once the host interface is locked in response to a trust domain entering a secure state, only the registers in the list are allowed for access in one or more engines of the GPU.

In some embodiments, the system 300 further provides for security protection for secure batch buffers, such as the illustrated secure batch buffer 350. The secure batch buffers provide an exception to the downgrading of PF privileges to VF privileges. In some embodiments, all commands of secure batch buffers are to be authenticated by the graphics security microcontroller 340, wherein the authentication may be performed at boot up or at another time. The secure batch buffer is then to be copied by the graphics security microcontroller to a secure location 325 in memory 320. In this manner, the system assists in providing a means for execution of secure commands through authentication and storage of secure batch buffers in the system, while protecting against the use of a secure batch buffer by an attacker in an attack on a trust domain.

FIG. 4 is an illustration of a host interface for a system or apparatus, according to some embodiments. A system 400 includes a host interface 430 to provide register protection in operation of a GPU 440. In addition to other elements described herein, the host interface 430 is operable to provide an unsupported request response (UR) 437 in response to an attempted access to a higher privileged register. In some embodiments, the host interface is further to provide error interrupts to a trust domain upon detection of certain register accesses. As illustrated in FIG. 4, a trusted device virtual machine (TD VM) 410, a non-TD VM 415, and PF KMD 425 may attempt to access the GPU 440 via the host interface 430. In some embodiments, a trust device assigned interface 420 is provided. As illustrated, access is limited to guest accessible registers.

In some embodiments, a confidentiality bit is provided in commands associated with guests to indicate whether or not the guest is a trust domain, such as TD VM 410, with the confidentiality bit then to indicate a device state associated with the guest. If a TD 410 is in a secure state in which the memory and memory mapped interface are locked, then error interrupts 439 are to be generated when the confidentiality bit is set.

Figure 5A:
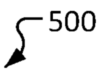
FIGS. 5A and 5B illustrate command handling in a GPU according to some embodiments.
Figure 5A:
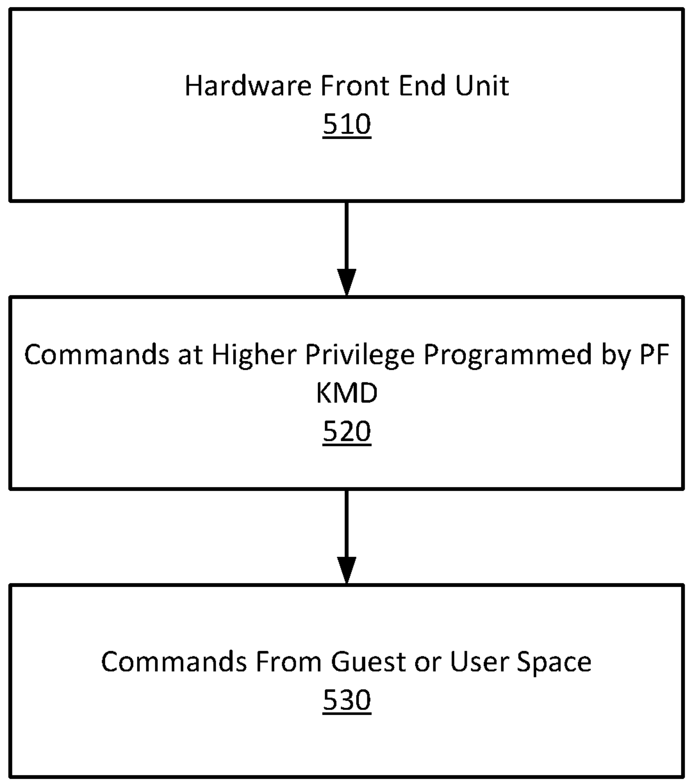
Figure 5B:
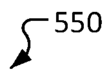
Figure 5B:
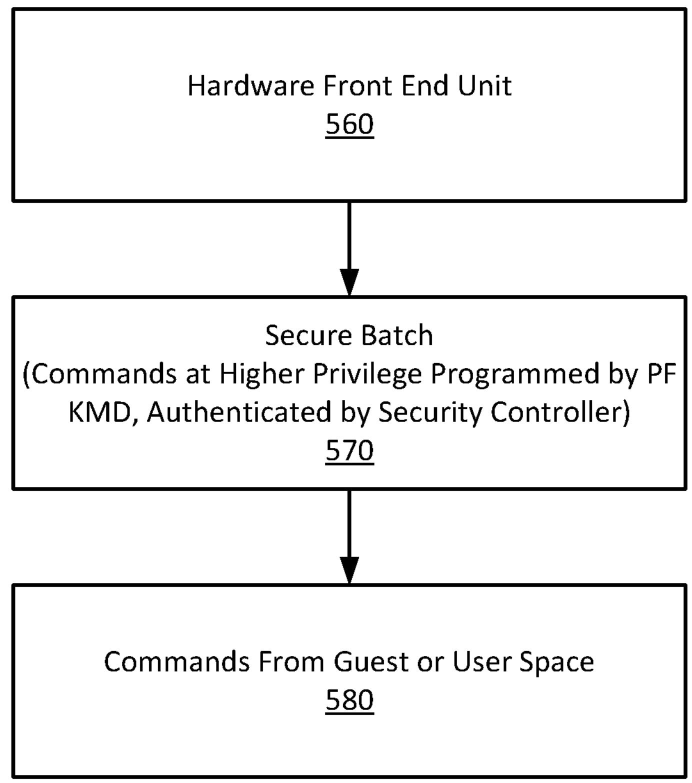

FIGS. 5A and 5B illustrate command handling in a GPU according to some embodiments. In a normal command flow, a GPU allows for commands operating at a PF privilege to allow for any runtime configuration that could impact functionality or performance. This requires programming of registers that are not available in the user space. A high level command flow is as shown in FIG. 5A, wherein the hardware front end unit 510 first fetches the higher privilege commands programmed by the PF KMD, and then switches to the user space, shown as commands from a guest or user space 530.

In some embodiments, an apparatus, system, or process is to address a higher privilege batch operating for normal functioning of a TD workload on a GPU. As shown in FIG. 5B, a secure batch buffer concept is to allow a set of instructions that are signed and authenticated by a security controller. When running on behalf of a TD, the hardware front end unit 560 is to default to allowing only the secure batch buffer. This is shown as the hardware front end unit 560 fetching the secure batch, which contains commands at a higher privilege that are programmed by the PF KMD and are authenticated by the security controller 570. In this manner, the security controller can ensure that only a pre-defined list of registers that cannot affect the confidentiality or integrity of the data are allowed for access in this batch buffer. Following this, the hardware front end unit 560 can then switch to the user space, shown as commands from a guest or user space 580.

Figure 6:
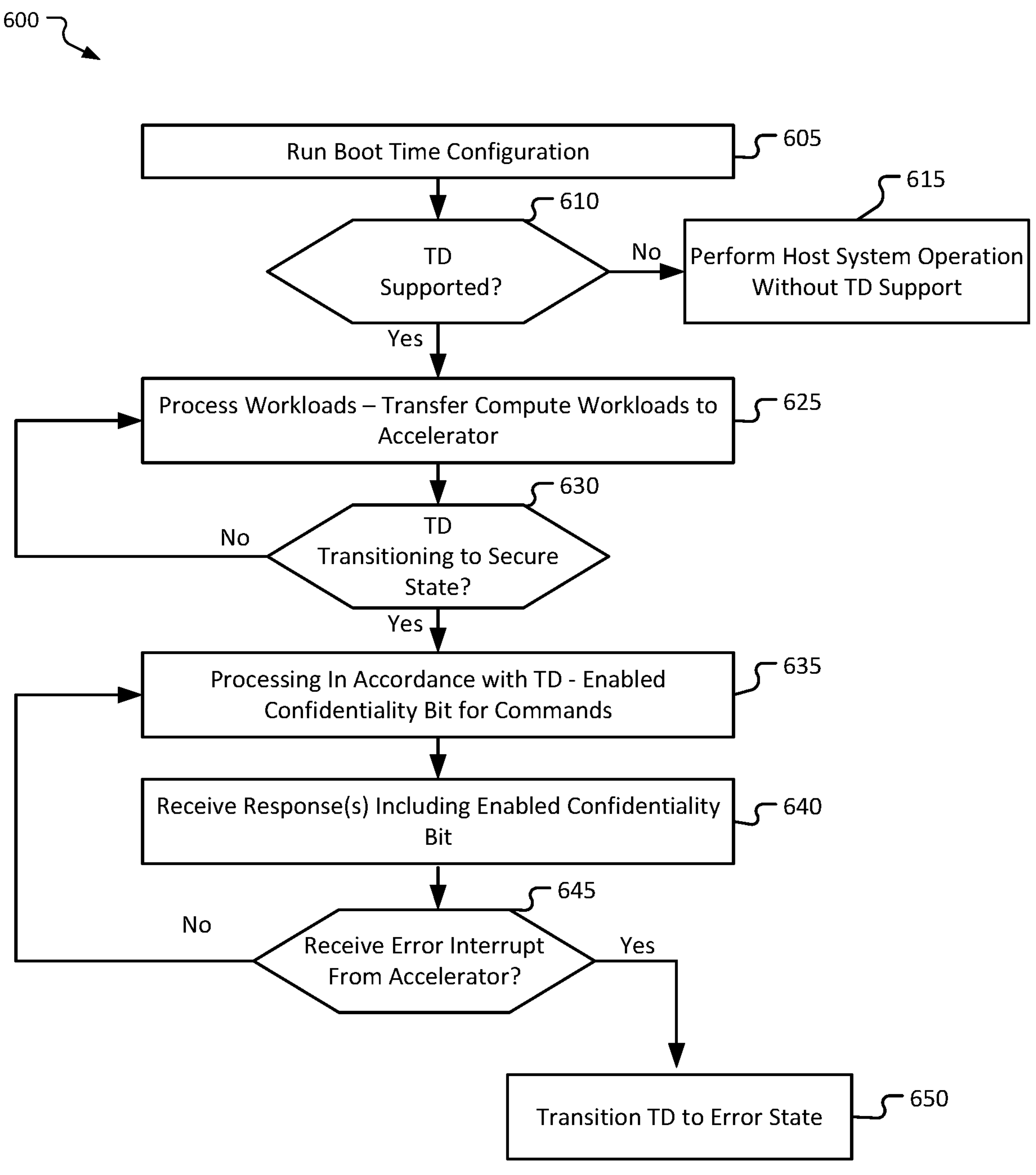
FIG. 6 is a flowchart to illustrate a process for security and support for trust domain operation at a host system, according to some embodiments.

FIG. 6 is a flowchart to illustrate a process for security and support for trust domain operation at a host system, according to some embodiments. In some embodiments, a process 600 includes running a boot time configuration to determine if a host system supports a trust domain 605. If the trust domain is not supported 610, the host system process may perform without trust domain support 615.

Following boot up, the host system proceeds with processing of workloads including transfer of compute workloads to an accelerator 625. Upon the trust domain transitioning to a secure (locked or run) state 630, the host system is to proceed with processing in accordance with the trust domain 635, including enabling a confidentiality bit for commands transferred to the accelerator to indicate that the trust domain is in a secure state. In some embodiments, the host system may receive one or more responses including an enabled confidentiality bit 640, the confidentiality bit indicating a transaction is made on behalf of a trust domain device.

In some embodiments, upon receiving an error interrupt from the accelerator 645 (indicating an attempted access to a register that is outside of allowed accesses), the trust domain may transition to an error state 650 or take other action, thus assisting in protecting the host system from a possible attack on the trust domain. Otherwise, the process 600 may continue with processing in accordance with the trust domain 635. Upon the trust domain transitioning out of the secure state, the process may return to non-TD processing (not illustrated in FIG. 6).

Figure 7:
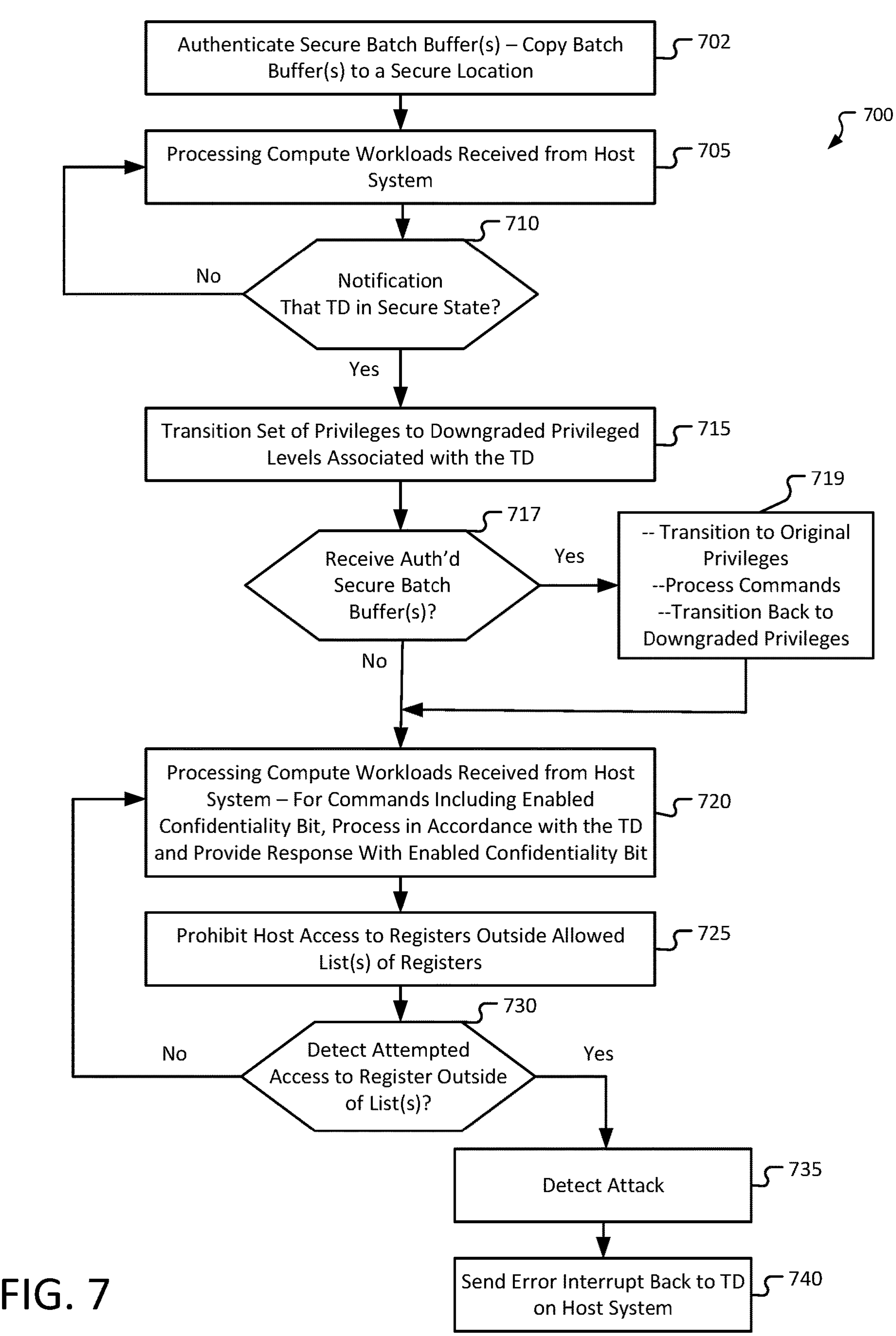
FIG. 7 is a flowchart to illustrate a process for security and support for trust domain operation at an accelerator, according to some embodiments.

FIG. 7 is a flowchart to illustrate a process for security and support for trust domain operation at an accelerator, according to some embodiments. In some embodiments, if applicable in a particular instance, a 700 process may include authenticating one or more secure batch buffers by an accelerator (such as a GPU) 702, with the one or more batch buffers to be stored in a secure location in memory. The secure batch buffers may be authenticated at boot up of the host system or may be authenticated at a different time, depending on a particular embodiment. The secure location may include, for example, sequestered memory or integrity protected memory. In some embodiments, a process 700 further includes processing at the compute workloads received from a host system 705. Upon receiving a notification that a trust domain is in a secure (locked or run) state 710, the accelerator is to transition an original set of privileges to a downgraded set of privilege levels in accordance with the trust domain 715 and proceed with processing of compute workloads.

In some embodiments, upon receiving one or more authenticated secure batch buffers 717, the process 700 provides for processing of commands of the secure batch buffers under the original set of privileges, thus providing an exception for authenticated commands. In some embodiments, the process includes transitioning to the original set of privileges; processing commands of the secure batch buffers; and transitioning back to the downgraded set of privileges following the processing of the commands of the secure batch buffers 719.

In some embodiments, processing of compute workloads includes, upon receiving a command from the host system including an enabled confidentiality bit, processing the command in accordance with the trust domain. In some embodiments, the processing further includes providing a response including an enabled confidentiality bit to indicate a transaction is made on behalf of the trust domain.

In some embodiments, the host system is prohibited from accessing registers that are outside an allowed list or lists of registers while the trust domain is in a secure state 725. For example, a graphics microcontroller includes a register range that is open for access by the host system. Further, a host interface includes an allowed list of registers, as programmed by a security controller, and, once the host interface is locked in response to a trust domain entering a secure state, only the registers in the list are allowed for access in one or more engines of the accelerator.

In some embodiments, upon detecting an attempted access to a register outside of the lists of allowed registers while the trust domain is in the secure state 730, an attack is detected 735, and an error interrupt is sent back to the trust domain running on the CPU host 740.

Upon the trust domain transitioning out of the secure state, the process may return to non-TD processing, including returning privileges to a prior state (not illustrated in FIG. 7).

Figure 8:
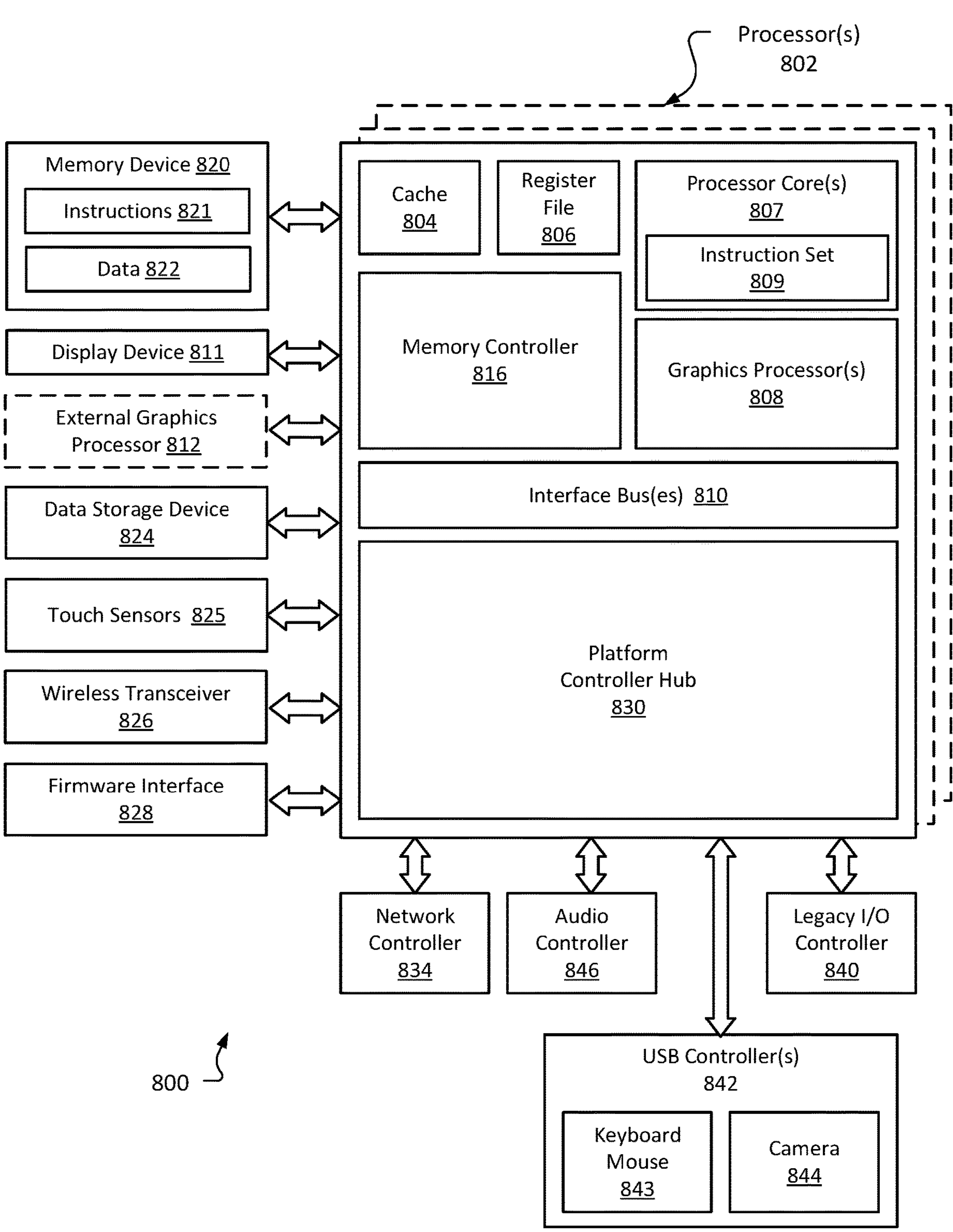
FIG. 8 illustrates an embodiment of an exemplary computing architecture for security and support for trust domain operation, according to some embodiments.

FIG. 8 illustrates an embodiment of an exemplary computing architecture for security and support for trust domain operation, according to some embodiments. In various embodiments as described above, a computing architecture 800 may comprise or be implemented as part of an electronic device. In some embodiments, the computing architecture 800 may be representative, for example, of a computer system that implements one or more components of the operating environments described above. The computing architecture 800 may be utilized to provide security and support for trust domain operation, such as described in FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes one or more processors 802 and one or more graphics processors 808, and may be a single processor desktop system, a multiprocessor workstation system, or a server system having a large number of processors 802 or processor cores 807. In one embodiment, the system 800 is a processing platform incorporated within a system-on-a-chip (SoC or SOC) integrated circuit for use in mobile, handheld, or embedded devices.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory 804 is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the system. The interface bus 810, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 802 include an integrated memory controller 816 and a platform controller hub 830. The memory controller 816 facilitates communication between a memory device and other components of the system 800, while the platform controller hub (PCH) 830 provides connections to I/O devices via a local I/O bus.

Memory device 820 can be a dynamic random-access memory (DRAM) device, a static random-access memory (SRAM) device, non-volatile memory device such as flash memory device or phase-change memory device, or some other memory device having suitable performance to serve as process memory. Memory device 820 may further include non-volatile memory elements for storage of firmware. In one embodiment the memory device 820 can operate as system memory for the system 800, to store data 822 and instructions 821 for use when the one or more processors 802 execute an application or process. Memory controller hub 816 also couples with an optional external graphics processor 812, which may communicate with the one or more graphics processors 808 in processors 802 to perform graphics and media operations. In some embodiments a display device 811 can connect to the processor(s) 802. The display device 811 can be one or more of an internal display device, as in a mobile electronic device or a laptop device, or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., hard disk drive, flash memory, etc.). The data storage device 824 can connect via a storage interface (e.g., SATA) or via a peripheral bus, such as a Peripheral Component Interconnect bus (e.g., PCI, PCI Express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, Long Term Evolution (LTE), or 5G transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high definition audio controller. In one embodiment the system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium, such as a non-transitory medium, having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, a method includes processing, at an accelerator, one or more compute workloads received from a host system; upon receiving a notification that a trust domain has transitioned to a secure state, transition an original set of privileges for the accelerator to a downgraded set of privileges; upon receiving a command from the host system for the trust domain, processing the command in accordance with the trust domain; and upon receiving a request from the host system to access a register, for a register included in an allowed list of registers for access, allow access to the register, and, for a register that is not within the allowed list of registers for access, disallowing access to the register.

In Example 2, the method further includes authenticating one or more secure batch buffers associated with the trust domain; and storing the one or more secure batch buffers in a secure location in memory, wherein processing the workloads includes processing the one or more secure batch buffers.

In Example 3, the secure location is one of sequestered memory or integrity protected memory.

In Example 4, authenticating the one or more secure batch buffers occurs at a boot time for the host system.

In Example 5, the method further includes receiving a secure batch buffer from the host system for processing; transitioning privileges for the accelerator to the original set of privileges; and processing the secure batch buffer.

In Example 6, the method further includes transitioning privileges for the accelerator back to the downgraded set of privileges following processing of the secure batch buffer.

In Example 7, the set of privileges are downgraded upon a secure connection being established between a trust domain of the host system and a trust domain of the accelerator.

In Example 8, the method further includes, for a register that is not within the allowed list of registers for access, generating an error interrupt response and directing the response to the trust domain at the host system.

In Example 9, the original set of privileges for the accelerator includes a physical function (PF) privilege and a virtual function (VF) privilege; and wherein downgrading the set of privileges includes downgrading the PF privilege to the VF privilege.

In Example 10, the accelerator includes a graphics processing unit (GPU).

In Example 11, one or more non-transitory computer-readable storage mediums having stored thereon executable computer program instructions that, when executed by one or more processors, cause the one or more processors to perform operations including authenticating a boot time configuration to determine if a host system supports a trust domain; processing workloads for guests of the host system, including transfer of one or more compute workloads to an accelerator; transitioning the trust domain to a secure state; and, upon the trust domain transitioning to the secure state, processing the workloads in accordance with the trust domain.

In Example 12, the instructions further include instructions for, upon receiving a response indicating an error interrupt from the accelerator directed to the trust domain, transitioning the trust domain to an error state.

In Example 13, the transitioning of the trust domain to the secure state includes establishing a secure connection between the trust domain and a trust domain for the accelerator.

In Example 14, the accelerator includes a set of privileges for access to registers of the accelerator, including a physical function (PF) privilege and a virtual function (VF) privilege; and wherein the secure state includes downgrading of the set of privileges, including downgrading the PF privilege to the VF privilege.

In Example 15, processing the workloads in accordance with the trust domain includes setting a confidentiality bit for commands to the accelerator to indicate whether a guest is a trust domain.

In Example 16, the accelerator includes a graphics processing unit (GPU).

In Example 17, an apparatus includes one or more processors including a graphics processing unit (GPU), wherein the GPU supports one or more trust domains (TD); and a graphics security microcontroller including trusted firmware, wherein the GPU is to process one or more compute workloads received from a host system; upon receiving a notification that a trust domain of the host system has transitioned to a secure state, transition an original set of privileges for the GPU to a downgraded set of privileges; upon receiving a command from the host system for the trust domain, processing the command in accordance with the trust domain; and upon receiving a request from the host system to access a register, for a register included in an allowed list of registers for access, allow access to the register, and, for a register that is not within the allowed list of registers for access, disallow access to the register.

In Example 18, the GPU is further to receive a secure batch buffer for processing; transition privileges for the GPU to the original set of privileges; and process the secure batch buffer.

In Example 19, the GPU is further to transition privileges for the GPU back to the downgraded set of privileges following processing of the secure batch buffer.

In Example 20, the GPU is further to, for a register that is not within the allowed list of registers for access, generate an error interrupt response and direct the response to the trust domain at the host system.

In Example 21, the original set of privileges for the GPU includes a physical function (PF) privilege and a virtual function (VF) privileged; and wherein downgrading the set of privileges includes downgrading the PF privilege to the VF privilege.

In Example 22, an apparatus includes means for authenticating a boot time configuration to determine if a host system supports a trust domain; means for processing workloads for guests of the host system, including transfer of one or more compute workloads to an accelerator; means for transitioning the trust domain to a secure state; and means for processing the workloads in accordance with the trust domain upon the trust domain transitioning to the secure state.

In Example 23, the apparatus further includes means for transitioning the trust domain to an error state upon receiving a response indicating an error interrupt from the accelerator directed to the trust domain.

In Example 24, the transitioning of the trust domain to the secure state includes establishing a secure connection between the trust domain and a trust domain for the accelerator.

In Example 25, the accelerator includes a set of privileges for access to registers of the accelerator, including a physical function (PF) privilege and a virtual function (VF) privilege; and wherein the secure state includes downgrading of the set of privileges, including downgrading the PF privilege to the VF privilege.

In Example 26, processing the workloads in accordance with the trust domain includes setting a confidentiality bit for commands to the accelerator to indicate whether a guest is a trust domain.

In Example 27, the accelerator includes a graphics processing unit (GPU).

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method comprising:

processing, at an accelerator, one or more compute workloads received from a host system;

upon receiving a notification that a trust domain has transitioned to a secure state, transition an original set of register access privileges for the accelerator to a downgraded set of register access privileges, wherein the original set of register access privileges allow a plurality of registers to be accessed by the trust domain and from a privilege level more privileged than an access by the trust domain, and wherein the downgraded set of register access privileges do not allow the plurality of registers to be accessed from the privilege level but allow the plurality of registers to be accessed by the trust domain;

upon receiving a command from the host system for the trust domain, processing the command in accordance with the trust domain; and upon receiving a request from the host system to access a register:

for a register included in an allowed list of registers for access, allow access to the register, and for a register that is not within the allowed list of registers for access, disallowing access to the register.

2. The method of claim 1, further comprising:

authenticating one or more secure batch buffers associated with the trust domain; and storing the one or more secure batch buffers in a secure location in memory;

wherein processing the one or more compute workloads includes processing the one or more secure batch buffers.

3. The method of claim 2, wherein the secure location is one of sequestered memory or integrity protected memory.

4. The method of claim 2, wherein authenticating the one or more secure batch buffers occurs at a boot time for the host system.

5. The method of claim 1, further comprising:

receiving a secure batch buffer from the host system for processing;

transitioning register access privileges for the accelerator to the original set of register access privileges; and processing the secure batch buffer.

6. The method of claim 5, further comprising transitioning register access privileges for the accelerator back to the downgraded set of register access privileges following processing of the secure batch buffer.

7. The method of claim 1, wherein the original set of register access privileges are downgraded upon a secure connection being established between a trust domain of the host system and a trust domain of the accelerator.

8. The method of claim 1, further comprising:

for a register that is not within the allowed list of registers for access, generating an error interrupt response and directing the error interrupt response to the trust domain at the host system.

9. The method of claim 1, wherein:

the original set of register access privileges for the accelerator includes a physical function (PF) privilege and a virtual function (VF) privilege; and downgrading the original set of register access privileges includes downgrading the PF privilege to the VF privilege.

10. The method of claim 9, wherein the accelerator includes a graphics processing unit (GPU).

11. One or more non-transitory computer-readable storage mediums having stored thereon executable computer program instructions that, when executed by one or more processors, cause the one or more processors to perform operations including to:

authenticate a boot time configuration to determine if a host system supports a trust domain;

process workloads for guests of the host system, including transfer of one or more compute workloads to an accelerator;

transition the trust domain to a secure state;

downgrade register access privileges of a plurality of registers of the accelerator from being accessible by both the trust domain and a privilege level more privileged than an access by the trust domain to being accessible by the trust domain but not by the privilege level; and upon the trust domain transitioning to the secure state, process the workloads in accordance with the trust domain.

12. The one or more non-transitory computer-readable storage mediums of claim 11, wherein the executable computer program instructions further include executable computer program instructions for:

upon receiving a response indicating an error interrupt from the accelerator directed to the trust domain, transitioning the trust domain to an error state.

13. The one or more non-transitory computer-readable storage mediums of claim 11, wherein the transition of the trust domain to the secure state includes establishing a secure connection between the trust domain and a trust domain for the accelerator.

14. The one or more non-transitory computer-readable storage mediums of claim 11, wherein:

downgrading the register access privileges comprises downgrading from physical function (PF) privilege to virtual function (VF) privilege.

15. The one or more non-transitory computer-readable storage mediums of claim 11, wherein processing the workloads in accordance with the trust domain includes setting a confidentiality bit for commands to the accelerator to indicate whether a guest is a trust domain.

16. The one or more non-transitory computer-readable storage mediums of claim 11, wherein the accelerator includes a graphics processing unit (GPU).

17. An apparatus comprising:

one or more processors including a graphics processing unit (GPU), wherein the GPU supports one or more trust domains (TD); and a graphics security microcontroller including trusted firmware;

wherein the GPU is to:

process one or more compute workloads received from a host system;

upon receiving a notification that a trust domain of the host system has transitioned to a secure state, transition an original set of register access privileges for the GPU to a downgraded set of register access privileges, wherein the original set of register access privileges allow a plurality of registers to be accessed by the trust domain and from a privilege level more privileged than an access by the trust domain, and wherein the downgraded set of register access privileges do not allow the plurality of registers to be accessed from the privilege level but allow the plurality of registers to be accessed by the trust domain;

upon receiving a command from the host system for the trust domain, processing the command in accordance with the trust domain; and upon receiving a request from the host system to access a register:

for a register included in an allowed list of registers for access, allow access to the register, and for a register that is not within the allowed list of registers for access, disallow access to the register.

18. The apparatus of claim 17, wherein the GPU is further to:

receive a secure batch buffer for processing;

transition register access privileges for the GPU to the original set of register access privileges; and process the secure batch buffer.

19. The apparatus of claim 18, wherein the GPU is further to:

transition register access privileges for the GPU back to the downgraded set of register access privileges following processing of the secure batch buffer.

20. The apparatus of claim 17, wherein the GPU is further to:

for a register that is not within the allowed list of registers for access, generate an error interrupt response and direct the error interrupt response to the trust domain at the host system.

21. The apparatus of claim 17, wherein:

the original set of register access privileges for the GPU includes a physical function (PF) privilege and a virtual function (VF) privilege; and downgrading the original set of register access privileges, including downgrading the PF privilege to the VF privilege.

* * * * *